United States Patent
Zhong et al.

(10) Patent No.: US 9,614,886 B2
(45) Date of Patent: Apr. 4, 2017

(54) METHOD FOR PROCESSING INFORMATION AND SERVER

(71) Applicant: LENOVO (BEIJING) CO., LTD., Haidian District, Beijing (CN)

(72) Inventors: Qin Zhong, Beijing (CN); Zhiqiang Zhao, Beijing (CN); Xiaobo Jia, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 238 days.

(21) Appl. No.: 14/225,828

(22) Filed: Mar. 26, 2014

(65) Prior Publication Data
US 2014/0297810 A1   Oct. 2, 2014

(30) Foreign Application Priority Data

Mar. 27, 2013 (CN) .......................... 2013 1 0102689

(51) Int. Cl.
*G06F 15/16* (2006.01)
*H04L 29/06* (2006.01)

(52) U.S. Cl.
CPC ........ *H04L 65/602* (2013.01); *H04L 65/4084* (2013.01)

(58) Field of Classification Search
CPC .......................... H04L 65/602; H04L 65/4084
See application file for complete search history.

(56) References Cited

U.S. PATENT DOCUMENTS 5,991,306 A * 11/1999 Burns ............... G06F 17/30902 370/429
6,085,193 A *  7/2000 Malkin ............ G06F 17/30902
(Continued)

FOREIGN PATENT DOCUMENTS

| CN | 1272189 A | 11/2000 |
| CN | 102222098 A | 10/2011 |
| CN | 102355490 A | 2/2012 |

OTHER PUBLICATIONS

Cai-rong,Yan et al., "A Scheduling Algorithm Based on Web Prefetching for Cluster Servers", *Control and Decision*, vol. 21, No. 3, Mar. 2006, pp. 319-322. (English Abstract only).
(Continued)

*Primary Examiner* — Arvin Eskandarnia
*Assistant Examiner* — Javier O Guzman
(74) *Attorney, Agent, or Firm* — Brinks Gilson & Lione; G. Peter Nichols

(57) ABSTRACT

A method for processing information applied in a server and the corresponding server is described. The method is applied in a server that stores a file set including a plurality of stream media files. The method includes obtaining a transition parameter when a first terminal apparatus accesses a file set when the first terminal apparatus accesses stream media file in the file set; making statistics of transition probability of each stream media file in the file set transiting to the respective stream media files in the file set according to the transition parameter of at least one first terminal apparatus; determining a target stream media file that the first terminal apparatus accesses most frequently in the stream media files in the file set according to the transition probability; and transmitting the target stream media file to a second terminal apparatus.

16 Claims, 2 Drawing Sheets

(56) References Cited

U.S. PATENT DOCUMENTS

| | | | | |
|---|---|---|---|---|
| 7,194,466 B2* | 3/2007 | Chen | ............... | G06F 17/30707 |
| 8,725,510 B2* | 5/2014 | Yoshiike | ............. | G06N 99/005 |
| | | | | 704/256 |
| 8,775,664 B2* | 7/2014 | McCoy | ............. | H04N 21/4333 |
| | | | | 709/219 |
| 8,966,036 B1* | 2/2015 | Asgekar | ................... | G06F 7/00 |
| | | | | 707/706 |
| 9,129,214 B1* | 9/2015 | Gomez-Uribe | ........ | G06N 7/005 |
| 2004/0237107 A1* | 11/2004 | Staples | ............. | H04L 29/06027 |
| | | | | 725/47 |
| 2006/0080356 A1* | 4/2006 | Burges | ............. | G06F 17/30017 |
| 2007/0156843 A1* | 7/2007 | Sagen | ............ | H04N 21/234309 |
| | | | | 709/217 |
| 2007/0260428 A1* | 11/2007 | Anderson | ............ | G06F 11/263 |
| | | | | 702/186 |
| 2007/0300300 A1* | 12/2007 | Guo | ..................... | G06F 21/552 |
| | | | | 726/23 |
| 2013/0013458 A1* | 1/2013 | Uribe | ................ | G06Q 30/0201 |
| | | | | 705/26.64 |

OTHER PUBLICATIONS

Office Action, and English language translation thereof, in corresponding Chinese Application No. 201310102689.4, dated Nov. 30, 2016, 12 pages.

* cited by examiner

METHOD FOR PROCESSING INFORMATION AND SERVER

BACKGROUND

This application claims priority to Chinese patent application No. 201310102689.4 filed on Mar. 27, 2013, the entire contents of which are incorporated herein by reference.

The present invention relates to a method for processing information applied in a server and the corresponding server.

With the development of cloud techniques and internet techniques, for example, the terminal electronic apparatus such as a personal computer, a notebook computer, a tablet computer, a smart phone and a portable multimedia player can view material such as picture, text, movie or the like stored at a cloud end through 3G, WIFI or the like at any time. When the terminal apparatus carries out data communication with a cloud end server, in the prior arts, the data stored at the cloud end is generally downloaded to local host completely and then the terminal apparatus carries out the related read-write operation or transmits the data stored at the cloud end to the terminal apparatus in a form of stream media.

Large amount of stream media files such as video, audio or the like may be stored in the cloud end server. These stream media files may be shared. For example, a user shares his favorite video files at the cloud end to let other users view. However, since the networking condition of the terminal apparatus, especially that of a portable terminal apparatus such as a smart phone is limited by factors such as band width, flow amount, power consumption or the like, the user experience at the time of transmitting in the form of stream media in the wireless networks is usually bad. Especially when the user is not interested in the content viewed currently and skip to content that has not been synchronized to the terminal apparatus from the cloud end server, it generally needs to wait for a long time, and wastes flow of data that has been previously synchronized to the terminal apparatus from the server.

SUMMARY

The purpose of the embodiments of the present invention is to provide a method for processing information applied in a server and the corresponding server to solve the above problem.

One embodiment of the present invention provides a method for processing information applied in a server which stores a file set including a plurality of stream media files. The method includes: obtaining a transition parameter at the time of accessing the file set by a first terminal apparatus when the first terminal apparatus accesses the stream media file in the file set, the transition parameter being for indicating a transition to a second stream media file from a first stream media file in the file set when the first terminal apparatus accesses, and the first stream media file is same as or different from the second stream media file; making statistics of a transition probability of each stream media file in the file set transiting to the respective stream media file in the file set according to the transition parameter of at least one first terminal apparatus; determining a target stream media file that the first terminal apparatus accesses most frequently in the stream media file in the file set according to the transition probability; and transmitting the target stream media file to a second terminal apparatus.

Another embodiment of the present invention provides a server including: a storing unit configured to store a file set including a plurality of stream media files; a transition parameter acquiring unit configured to obtain a transition parameter at the time of the first terminal apparatus accessing the file set when the first terminal apparatus accesses the stream media file in the file set, the transition parameter being for indicating the first terminal apparatus transits to a second stream media file from a first stream media file when the first terminal apparatus accesses, and the first stream media file being same as or different from the second stream media file; a probability statistics unit configured to make statistics of a transition probability of each stream media file in the file set transiting to the respective stream media files in the file set according to the transition parameter of at least one first terminal apparatus; a file determining unit configured to determine the target stream media file that the first terminal apparatus accesses most frequently in the stream media file in the file set according to the transition probability; and a transmitting unit configured to transmit the target stream media file to the second terminal apparatus.

With the scheme provided in the above-described embodiments of the present invention, the stream media file in the file set that the user may be mostly interested in is determined according to the transition probability of the previous user accessing the stream media file in the file set stored in the server, which acts as a pre-fetch strategy of the stream media file in the file set, and the target stream media file is transmitted to the terminal apparatus according to the pre-fetch strategy, so that the hit rate that the stream media file transmitted from the server is the file that the user wishes to view can be increased. Therefore, not only the waiting time of the user is decreased and the user's experience is improved, but also unnecessary overhead of network flow can be decreased.

BRIEF DESCRIPTION OF THE DRAWINGS

In order to describe the technical solution of the embodiment of the invention more clearly, the accompanying drawings necessary for the description of the embodiments are explained simply. The accompanying drawings in the following description are only exemplary embodiment of the invention.

DETAILED DESCRIPTION

Hereinafter, the preferred embodiments of the invention are described in detail with reference to the accompanying drawings. It is noticed that in the specification and accompanying drawings, substantially the same steps and elements are represented by the same reference signs, and the repetitive explanation on these steps and elements would be omitted.

In the following embodiments of the present invention, the terminal apparatus refers to an apparatus capable of communicating with other apparatus. The concrete form of the electronic apparatus includes but not limited to the personal computer, a notebook computer, a tablet computer, a smart phone, a portable multimedia player and the game machine or the like.

Figure 1:
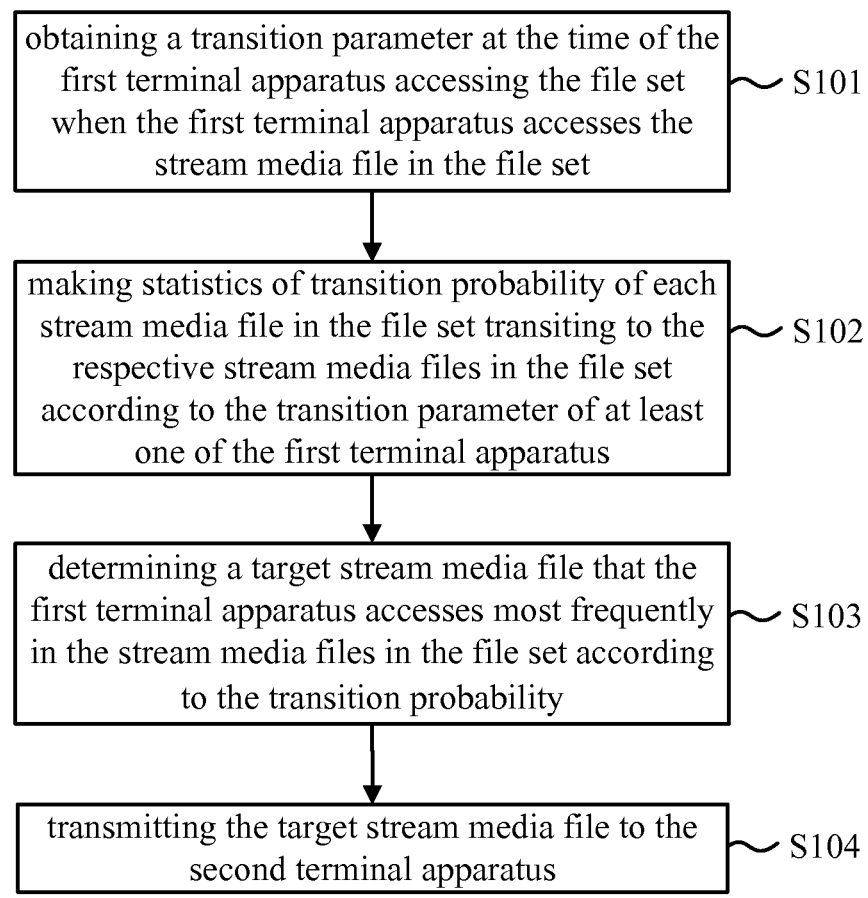
FIG. 1 is a flow chart describing the method for processing information according to one embodiment of the present invention.

FIG. 1 is a flow chart describing the method 100 for processing information according to one embodiment of the present invention. Hereinafter, the method for processing information according to one embodiment of the present invention is described with reference to FIG. 1. The method 100 for processing information can be applied in a server. A file set including a plurality of stream media files is stored in the server according to the embodiment of the present invention. For example, the server according to the embodiment of the present invention may be a server for providing remote storage such as cloud storage service to the user. In the embodiment according to the present invention, the file set including a plurality of stream media files being stored in the server may be a file set which can be accessed by a plurality of users. For example, the file set may be set as a file set that is shared at least for a part of users.

As shown in FIG. 1, in step S101, when the first terminal apparatus accesses the stream media file in the file set, a transition parameter at the time of the first terminal apparatus accessing the file set is obtained, wherein, the transition parameter is for indicating that the first terminal apparatus transits to a second stream media file from a first stream media file in the file set when the first terminal apparatus accesses, and the first stream media file is same as or different from the second stream media file.

According to one example of the present invention, each stream media file in the file set corresponds to a complete medium content. For example, the file set may be set for specific television drama, and the stream media file in the file set may be correspondent to a piece of drama in the specific television drama one by one. Also, for example, the file set may be a set of movies performed by a specific actor, and the stream media file in the file set may be correspondent to the movie performed by the specific actor one by one.

Further, the file set may correspond to a complete medium content, and the complete medium content is divided into a plurality of content segments, and the plurality of stream media file in the file set correspond to the plurality of content segments one by one. For example, the file set further corresponds to a video content with play time of 1 hour, and the video content is divided into six segments in the segment of 10 minutes. Six stream media files corresponding to the six segments respectively may be included in the file set.

Further, for example, when the first terminal apparatus interrupts the play of the content corresponding to the first stream media file during a period in which the first terminal apparatus plays the content corresponding to the first stream media file and turns to access another stream media file, or when the first terminal apparatus interrupts the play of the content corresponding to the first stream media file during a period in which the first terminal apparatus plays the content corresponding to the first stream media file and access the first stream media file once again, for example, playing from the start part of the content corresponding to the first stream media file once again, the another stream media file being turned to be accessed or the first stream media file being accessed once again can be taken as a transited second stream media file.

And then, in step S102, a transition probability of each stream media file in the file set transiting to the respective stream media file in the file set is made statistics according to the transition parameter of at least one first terminal apparatus. As explained in the above, preferably, the file set is a file set that is set as shared at least for a part of users, that is, the file set that can be accessed by a plurality of first terminal apparatuses. The server can make statistics of the transition probability of each stream media file in the file set transiting to other stream media files in the file set or the stream media file itself according to the transition parameter obtained when the at least one first terminal apparatus accesses the file set.

And then, in step S103, a target stream media file that the first terminal apparatus accesses most frequently is determined in the stream media file in the file set according to the statistical transition probability. According to one example of the present invention, in step S103, a stream media file having a characteristic of frequent returning is determined as the target stream media file in the stream media file in the file set according to the transition probability. In particular, the stream media file having the characteristic of frequent returning is a stream media file of which the probability of being accessed by the first terminal apparatus once again after being accessed by the first terminal apparatus and being subject to at least one transition satisfies a first predetermined conditions. That is, when the probability of a stream media file being accessed by the first terminal apparatus once again after being accessed by the first terminal apparatus satisfies the first predetermined conditions (for example, the probability is larger than a predetermined probability value), the stream media file can be regarded as having the characteristic of frequent returning.

According to one example of the present invention, the method 100 shown in FIG. 1 can further include generating a Markov chain related to the stream media file in the file set. In particular, it can generate file node in the Markov chain corresponding to the stream media file in the file set one by one, a start node of the Markov chain positioned in front of all file nodes and an end node of the Markov chain positioned at the end of all file nodes, so that the Markov chain is formed by the start node, the file nodes and the end node.

Further, method 100 shown in FIG. 1 can further include generating a Markov state transition matrix related to the Markov chain according to the statistical transition probability in step S102. In particular, the transition probability of each node in the Markov chain to other nodes or the node itself is determined according to the statistical transition probability in step S102. Then, the Markov state transition matrix is constructed according to the transition probability of each node to other nodes or the node itself.

Then, method 100 shown in FIG. 1 can further include determining node having intercommunication characteristic in the Markov chain according to the Markov state transition matrix, here, the transition probability between any two nodes having intercommunication characteristic is larger than zero. For example, when the Markov state transition matrix indicates that the transition probability of the third file node to the fifth file node in the Markov chain is larger than zero and the transition probability of the fifth file node to the third file node is larger than zero, the third file node and the fifth file node can be regarded as having intercommunication characteristic.

In this case, in step S103, the node having the characteristic of frequent returning is determined in the Markov chain according to the transition probability of each node in the Markov chain. In particular, when the probability of a stream media file corresponding to a node being accessed by the first terminal apparatus once again after being accessed by the first terminal apparatus satisfies the first predetermined conditions (for example, the probability is larger than a predetermined probability value, the node can be regarded as having the characteristic of frequent returning. Since nodes having intercommunication characteristic have same or similar property, when one node in the Markov chain is determined as having characteristic of frequent returning, other nodes having intercommunication characteristic with the node are determined as having the characteristic of frequent returning, so there is no need to determine the characteristic of frequent returning thereof for each node in the Markov chain, which reduces the operation required to be executed of the server. Then the media file corresponding to the node having the characteristic of frequent returning is as the target stream media file.

A schematic example of determining the target stream media file by generating the Markov chain related to the stream media file in the file set and constructing the Markov state transition matrix is described specifically as follows. In the example, the file set corresponds to a complete medium content, and the complete medium content is divided into 4 content segments, and the 4 stream media files included in the file set correspond to a plurality of content segments one by one. File nodes S1, S2, S3 and S4 in the Markov chain corresponding to the stream media file in the file set one by one are generated, and a start node S0 of the Markov chain positioned in front of all file nodes and an end node Se of the Markov chain positioned at the end of all file nodes are generated, so that the set of nodes of the Markov chain is {S0, S1, S2, S3, S4, Se}.

It assumes that the instance of the first terminal apparatus A accessing the file set is S0→S1→S2→S3→Se; the instance of the first terminal apparatus B accessing the file set is S0→S2→S4→Se; the instance of the first terminal apparatus C accessing the file set is S0→S4→S2→S3→Se; the instance of the first terminal apparatus D accessing the file set is S0→S1→Se; the instance of the first terminal apparatus E accessing the file set is S0→S2→S2→Se, and here the symbol "→" represents the transition. Thus, the transition parameters of the first terminal apparatuses A, B, C, D and E can be obtained, and the transition probability of each stream media file in the file set transiting to the respective stream media files in the file set is made statistics according to the transition parameters of the first terminal apparatuses A, B, C, D and E.

And then, the transition probability of each node in the Markov chain to other nodes or the node itself is determined according to the statistical transition probability. And as shown in table 1, the Markov state transition matrix is constructed according to the transition probability of each node to other nodes or the node itself.

TABLE I

| | S0 | S1 | S2 | S3 | S4 | Se |
|---|---|---|---|---|---|---|
| S0 | 0 | 0.5 | 0.25 | 0 | 0.25 | 0 |
| S1 | 0 | 0 | 0.5 | 0 | 0 | 0.5 |
| S2 | 0 | 0 | 0.25 | 0.5 | 0.25 | 0 |
| S3 | 0 | 0 | 0 | 0 | 0 | 1 |
| S4 | 0 | 0 | 0.5 | 0 | 0 | 0.5 |
| S5 | 0 | 0 | 0 | 0 | 0 | 1 |

In table 1, the leftmost column represents a source node at the time of the transition occurring, the upmost row represents a destination node at the time of the transition occurring, and the columns from the second column to the last column counted from left and the rows from the second row to the last row counted from above represent the statistical transition probability of each node in the Markov chain to itself or other nodes according to instance of the first terminal apparatuses A, B, C, D and E accessing the file set. For example, the probability of transiting to the node S0 from the node S2 is 0, the probability of transiting to the node S1 from the node S2 is 0, the probability of transiting to the node S2 itself from the node S2 is 0.25, the probability of transiting to the node S3 from the node S2 is 0.5, and the probability of transiting to the node S4 from the node S2 is 0.25.

Then, according to the Markov state transition matrix shown in table 1, nodes having the intercommunication characteristic in the Markov chain are determined. Since in the Markov chain, the transition probability of node S2 to node S4 is larger than zero and the transition probability of node S4 to node S2 is larger than zero, the nodes S2 and S4 have the intercommunication characteristic.

Then, according to the transition probability of each node, the nodes having the characteristic of frequent returning are determined in the Markov chain. As explained above, the necessary and sufficient condition of satisfying the characteristic of frequent returning is $$\sum_{n=1}^{\infty} P_{ii}^{(n)} = \infty,$$

that is, n times of transition is made since node i, and n is a positive integer, and the probability of returning to the node i again is infinity. For node S2, $$|P_{ii}^{(n)}| = \left|0.25^n + \sum_{n=1}^{\infty}\sum_{m=1}^{n} 0 2.5^{n-m} 0.5^m\right| = \left|0.25^n + \frac{8}{3}\right| > 1.$$

Wherein, n represents the times of transition being subjected to from the node i starting to access to being back to the node i, m represents the times of transition of transiting from the node i to other nodes in the n times of transition, here, it can return to the node i by n-m times of transition after m times of transition. According to convergence of positive series, it can decide that for node S2, $$\sum_{n=1}^{\infty} P_{ii}^{(n)} = \infty,$$

thus it can decide that node S2 has the characteristic of frequent returning. And, since the node S4 and the node S2 have the intercommunication characteristic, the node S4 can be decided as having the characteristic of frequent returning. And, since for the nodes S1 and S3, the probability of transiting n times from the node and back to the node is convergent, the nodes S1 and S3 are decided as having no characteristic of frequent returning. Then, the media file corresponding to the nodes S2 and S4 having the characteristic of frequent returning is as the target stream media file.

In this example, the media file corresponding to the nodes S2 and S4 are two media files to which many users skip back when they accesses the file set randomly. Therefore, the above result reflects the media file that the user repeatedly views most frequently.

Back to FIG. 1, at last, in step S104, the target stream media file is transmitted to the second terminal apparatus. Alternatively, in step S104, it can firstly obtain the network connection parameter of the second terminal apparatus and determine whether the network connection parameter of the second terminal apparatus satisfies a second predetermined condition. When the network connection parameter of the second terminal apparatus satisfies the second predetermined condition, the target stream media file is transmitted to the second terminal apparatus. For example, whether the second terminal apparatus is connected to the server through 3G network or wireless network can be determined according to the network connection parameter of the second terminal apparatus. Since generally in case of connecting to the server through 3G network, the cost of the flow of unit data is higher, thus, it can preset that the target stream media file is transmitted to the second terminal apparatus when the second terminal apparatus is connected to the server through the wireless network. Further, according to one example of the present invention, the target stream media file can be transmitted to the second terminal apparatus when the second terminal apparatus accesses the file set. For example, in the example described in combination with table 1 above, when the second terminal apparatus accesses the stream media in the file set corresponding to the node S1 in order, the target stream media files corresponding to the nodes S2 and S4 are transmitted to the second terminal apparatus. Alternatively, according to another embodiment of the present invention, the target stream media file can be transmitted to the second terminal apparatus when the second terminal apparatus accesses the file set or a selection instruction indicating the file set is received from the second terminal apparatus.

With the method for processing information of the present embodiment, the stream media file in the file set that the user may be interested in mostly is determined according to the transition probability of the previous user accessing the stream media file in the file set stored in the server, which is as a pre-fetch strategy of the stream media file in the file set, and the target stream media file is transmitted to the terminal apparatus according to the pre-fetch strategy, so that the hit rate that the stream media file transmitted from the server is the file that the user wishes to view can be increased. Therefore, not only the waiting time of the user is decreased and the user's experience is improved, but also the unnecessary overhead of network flow can be decreased.

Further, according to another example of the present invention, other than the transition probability, the target stream media file that the first terminal apparatus accesses most frequently can be determined in the stream media file in the file set in combination with other parameters. For example, the method 100 shown in FIG. 1 can further include obtaining access parameter at the time of the first terminal apparatus accessing the file set when the first terminal apparatus accesses the stream media file in the file set. The access parameter may include the stream media file accessed in the file set by the first terminal apparatus and duration of the access of the accessed stream media file or the like. In step S103, the target stream time file that the first terminal apparatus accesses most frequently is determined in the stream time file in the file set according to the transition probability and the access parameter. Also, for example, the method 100 shown in FIG. 1 can further include obtaining file parameter of the stream media file in the file set. The file parameter may be upload time and upgrade time of the file or the like. In step S103, the target stream time file that the first terminal apparatus accesses most frequently is determined in the stream time file in the file set according to the transition probability and the file parameter.

Further, according to another example of the present invention, after making statistics of the transition probability of each stream media file in the file set transiting to the respective stream media file in the file set according to the transition parameter, and when the first terminal apparatus accesses the file set, the transition probability of the respective stream media files in the file set can be updated according to the instance of the first terminal apparatus accessing the file set. For example, after transmitting the target stream media file to the second terminal apparatus, the second terminal apparatus can be as the first terminal apparatus, that is, the transition probability of the respective stream media files in the file set is updated according to the instance of the second terminal apparatus accessing the file set practically. More particularly, for example, in the example described in combination with table 1 above, after transmitting the target stream media file corresponding to the nodes S2 and S4 to the second terminal apparatus, the user of the second terminal apparatus may not select to play the target stream media file and select to play the stream media file corresponding to the node S1 and then select to play the stream media file corresponding to the node S3 and then select to play the stream media file corresponding to the node S1 once again. The second terminal apparatus can be as the first terminal apparatus at this time, that is, the transition probability of the respective stream media files in the file set are updated according to the instance of the second terminal apparatus accessing the file set practically.

Figure 2:
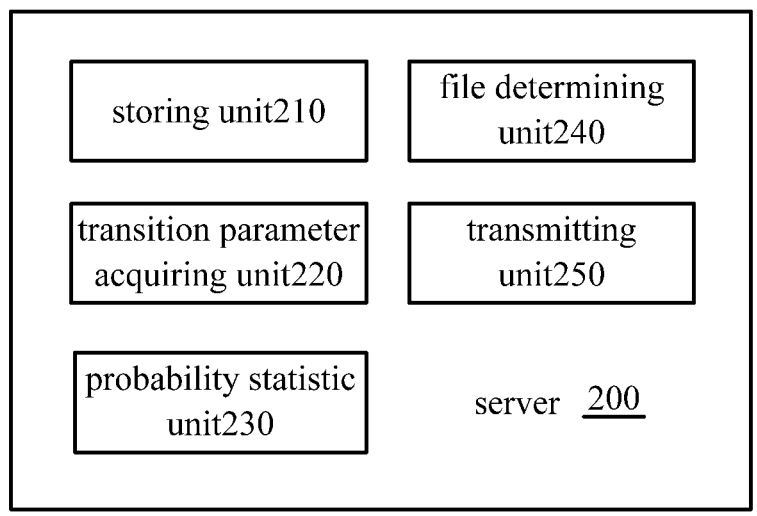
FIG. 2 is a schematic structured block view illustrating the server according to the embodiment of the present invention.

Hereinafter, the server of the embodiments of present invention is explained with reference to FIG. 2. FIG. 2 is a schematic structured block view illustrating the server 200 according to the embodiments of the present invention. As shown in FIG. 2, the server 200 of the present embodiment includes a storing unit 210, a transition parameter acquiring unit 220, a probability statistic unit 230, a file determining unit 240 and a transmitting unit 250. The respective module of the server 200 executes the above-described respective step/function of the method of FIG. 1, therefore, it will no longer describe for the sake of simplicity.

For example, the storing unit 210 may store a file set including a plurality of stream media files. For example, the server according to the embodiment of the present invention may be a server for providing remote storage such as cloud storage service to the user. In the embodiment according to the present invention, the file set including a plurality of stream media files stored in the server may be a file set which can be accessed by a plurality of users. For example, the file set may be set as a file set that is shared at least for a part of users.

According to one example of the present invention, each stream media file in the file set corresponds to a complete media content. For example, the file set may be set for specific television drama, and the stream media file in the file set may be correspondent to a piece of drama in the specific television drama one by one. Also, for example, the file set may be a set of movies performed by a specific actor, and the stream media file in the file set may be corresponding to the movie performed by the specific actor one by one.

Further, the file set may correspond to a complete medium content, and the complete medium content is divided into a plurality of content segments, and the plurality of stream media files in the file set correspond to the plurality of content segments one by one. For example, the file set further corresponds to a video content with play time of 1 hour, and the video content is divided into six segments in the segment of 10 minutes. Six stream media files corresponding to the six segments respectively may be included in the file set.

When the first terminal apparatus accesses the stream media file in the file set, the transition parameter acquiring unit 220 can obtain a transition parameter at the time of the first terminal apparatus accessing the file set, here, the transition parameter is for indicating that the first terminal apparatus transits to a second stream media file from a first stream media file in the file set when the first terminal apparatus accesses, and the first stream media file is same as or different from the second stream media file.

For example, when the first terminal apparatus interrupts play of the content corresponding to the first stream media file during a period in which the first terminal apparatus plays the content corresponding to the first stream media file and turns to access another stream media file, or when the first terminal apparatus interrupts play of the content corresponding to the first stream media file during a period in which the first terminal apparatus plays the content corresponding to the first stream media file and accesses the first stream media file once again, for example, in the case of playing from the start part of the content corresponding to the first stream media file once again, the another stream media file being turned to be accessed or the first stream media file being accessed once again can be as a transited second stream media file.

Then, the probability statistic unit 230 can make statistics of the transition probability of each stream media file in the file set transiting to the respective stream media file in the file set according to the transition parameter of at least one first terminal apparatus. As explained in the above, preferably, the file set is a file set that is set as shared at least for a part of users, that is, the file set that can be accessed by a plurality of first terminal apparatuses. The server can make statistics of the transition probability of each stream media file in the file set transiting to other stream media files in the file set or the stream media file itself according to the transition parameter obtained when the at least one first terminal apparatus accesses the file set.

Then, the file determining unit 240 can determine the target stream time file that the first terminal apparatus accesses most frequently in the stream time file in the file set according to the statistical transition probability. According to one example of the present invention, the file determining unit 240 can determine a stream media file having the characteristic of frequent returning in the stream media file in the file set as the target stream media file according to the transition probability. In particular, the stream media file having characteristic of frequent returning is a stream media file of which the probability of being accessed by the first terminal apparatus once again after being accessed by the first terminal apparatus and being subject to at least one transition satisfies a first predetermined conditions. That is, when the probability of a stream media file being accessed by the first terminal apparatus once again after being accessed by the first terminal apparatus satisfies the first predetermined conditions (for example, the probability is larger than a predetermined probability value, the stream media file is regarded as having characteristic of frequent returning.

According to one example of the present invention, the server 200 can further include a Markov chain generating unit. The Markov chain generating unit can generate a Markov chain related to the stream media file in the file set. In particular, the Markov chain generating unit can generate file node in the Markov chain corresponding to the stream media file in the file set one by one, and generate a start node of the Markov chain positioned in front of all file nodes and an end node of the Markov chain positioned at the end of all file nodes, so as to form the Markov chain by the start node, the file nodes and the end node.

Further, the server 200 can further include a transition matrix generating unit. The transition matrix generating unit can generate a Markov state transition matrix related to the Markov chain according to the statistical transition probability. In particular, the transition matrix generating unit can determine the transition probability of each node in the Markov chain to other nodes or the node itself according to the statistical transition probability, and then construct the Markov state transition matrix according to the transition probability of each node to other nodes or the node itself.

Then, the server 200 can further include an intercommunication characteristic node determining unit. The intercommunication characteristic node determining unit can determine nodes having the intercommunication characteristic in the Markov chain according to the Markov state transition matrix, here, the transition probability between any two nodes having the intercommunication characteristic is larger than zero. For example, when the Markov state transition matrix indicates that the transition probability of the third file node to the fifth file node in the Markov chain is larger than zero and the transition probability of the fifth file node to the third file node is larger than zero, the intercommunication characteristic node determining unit can determine that the third file node and the fifth file node have the intercommunication characteristic.

In this case, the file determining unit 240 can include a node determining module and a file determining module. The node determining module can determine nodes having the characteristic of frequent returning in the Markov chain according to the transition probability of each node in the Markov chain. In particular, when the probability of a stream media file corresponding to a node being accessed by the first terminal apparatus once again after being accessed by the first terminal apparatus satisfies the first predetermined conditions (for example, the probability is larger than a predetermined probability value, the node is regarded as having characteristic of frequent returning. Since nodes having intercommunication characteristic have same or similar property, when one node in the Markov chain is determined as having characteristic of frequent returning, the node determining module further determines that other nodes having intercommunication characteristic with the node also have the characteristic of frequent returning, so there is no need to determine the characteristic of frequent returning thereof for each node in the Markov chain, which reduces the operation required to be executed of the server. And then the file determining module can use the media file corresponding to the node having the characteristic of frequent returning as the target stream media file.

At last, the file determining module 250 can transmit the target stream media file to the second terminal apparatus. Alternatively, the server can further include a connection parameter acquiring unit and a connection determining unit. The connection parameter acquiring unit can obtain network connection parameter of the second terminal apparatus, and the connection determining unit can determine whether the network connection parameter of the second terminal apparatus satisfies the second predetermined condition. When the network connection parameter of the second terminal apparatus satisfies the second predetermined condition, the transmitting unit 250 can transmit the target stream media file to the second terminal apparatus. For example, the connection determining unit can determine whether the second terminal apparatus is connected to the server through 3G network or wireless network according to the network connection parameter of the second terminal apparatus. Since generally in case of connecting to the server through 3G network, the cost of the flow of unit data is higher, thus, it can preset that the target stream media file is transmitted to the second terminal apparatus when the second terminal apparatus is connected to the server through wireless network. Further, according to one example of the present invention, the transmitting unit 250 can transmit the target stream media file to the second terminal apparatus when the second terminal apparatus accesses the file set. For example, in the example described in combination with table 1 above, when the second terminal apparatus accesses the stream media in the file set corresponding to the node S1 in order, the target stream media files corresponding to the nodes S2 and S4 are transmitted to the second terminal apparatus. Alternatively, according to another embodiment of the present invention, the transmitting unit 250 can also transmit the target stream media file to the second terminal apparatus when the second terminal apparatus accesses the file set or a selection instruction indicating the file set is received from the second terminal apparatus.

With the server for processing information of the present embodiment, the stream media file in the file set that the user may be interested in mostly can be determined according to the transition probability of the previous user accessing the stream media file in the file set stored in the server, which is as a pre-fetch strategy of the stream media file in the file set, and the target stream media file is transmitted to the terminal apparatus according to the pre-fetch strategy, so that the hit rate that the stream media file transmitted from the server is the file that the user wishes to view can be increased. Therefore, not only the waiting time of the user is decreased and the user's experience is improved, but also the unnecessary overhead of network flow can be decreased.

Further, according to another example of the present invention, other than the transition probability, the target stream media file that the first terminal apparatus accesses most frequently can be determined in the stream media file in the file set in combination with other parameters. For example, the server can further include an access parameter acquiring unit. When the first terminal apparatus accesses the stream media file in the file set, the access parameter acquiring unit can obtain the access parameter when the first terminal apparatus accesses the file set. The access parameter may include the stream media file accessed in the file set by the first terminal apparatus and duration of the access of the accessed stream media file or the like. The file determining unit 240 can determine the target stream time file that the first terminal apparatus accesses most frequently in the stream media file in the file set according to the transition probability and the access parameter. Also, for example, the server can further include a file parameter acquiring unit. The file parameter acquiring unit can obtain the file parameter of the stream media file in the file set. The file parameter may be upload time and upgrade time of the file or the like. The file determining unit 240 can determine the target stream time file that the first terminal apparatus accesses most frequently in the stream time file in the file set according to the transition probability and the file parameter.

Further, according to another example of the present invention, after making statistics of the transition probability of each stream media file in the file set transiting to the respective stream media files in the file set according to the transition parameter, and when the first terminal apparatus accesses the file set, the probability statistic unit 230 can update the transition probability of the respective stream media files in the file set according to instance of the first terminal apparatus accessing the file set. For example, after transmitting the target stream media file to the second terminal apparatus, the second terminal apparatus can be as the first terminal apparatus, that is, the probability statistic unit 230 can update the transition probability of the respective stream media files in the file set according to instance of the second terminal apparatus accessing the file set practically. More particularly, for example, in the example described in combination with table 1 above, after transmitting the target stream media file corresponding to the nodes S2 and S4 to the second terminal apparatus, the user of the second terminal apparatus may not select to play the target stream media file and select to play the stream media file corresponding to the node S1 and then select to play the stream media file corresponding to the node S3 and then select to play the stream media file corresponding to the node S1 once again. The probability statistic unit 230 can use the second terminal apparatus as the first terminal apparatus at this time, that is, the transition probability of the respective stream media files in the file set is updated according to the instance of the second terminal apparatus accessing the file set practically.

Those skilled in the art can understand that, the units and the algorithm steps of the respective examples described in combination with the embodiments disclosed in this specification can be implemented by electronic hardware, computer software or the combination of both. And the software module can be placed in the computer storage medium in arbitrary form. In order to explain the interchangeability of the hardware and software clearly, the constitution and the steps of the respective example are described generally in terms of function in the above explanation. Whether the functions are executed by hardware or software is dependent on the specific applications and design constraint of the technical solution. Those skilled in the art can implement the described function by using different methods for each specific application, and such implementations are not regarded as beyond the scope of the invention.

Those skilled in the art can understand that the invention can be made various modifications, combinations, partial combinations and alternation depending on the designation needs and other factors, so long as they are in the range of the attached Claims and the equivalent ones.

The invention claimed is:
1. A method for processing information applied in a server which stores a file set including a plurality of stream media files therein, the method comprises:
   obtaining a transition parameter at the time of a first terminal apparatus accessing the file set when the first terminal apparatus accesses a stream media file in the file set, wherein, the transition parameter indicates that the first terminal apparatus transits to a second stream media file from a first stream media file in the file set when the first terminal apparatus accesses, and the first stream media file is the same as or different from a second stream media file;
   making statistics of a transition probability of each stream media file in the file set transiting to the respective stream media files in the file set according to the transition parameter of at least one first terminal apparatus;
   determining a target stream media file that the first terminal apparatus accesses most frequently in the stream media files in the file set according to the transition probability;
   generating a Markov chain related to the stream media file in the file set;
   generating file nodes in the Markov chain corresponding to the stream media files in the file set one by one;

generating a start node of the Markov chain positioned at front of all the file nodes and an end node of the Markov chain positioned at the end of all the file nodes;

generating a Markov state transition matrix related to the Markov chain according to the transition probability;

determining nodes having a two-way intercommunication characteristic in the Markov chain according to the Markov state transition matrix, wherein, the transition probability from a first node of any two nodes having the two-way intercommunication characteristic to a second node of any two nodes having the two-way intercommunication characteristic being lamer than zero and the transition probability from the second node of any two nodes having the two-way intercommunication characteristic to the first node of any two nodes having the two-way intercommunication characteristic being lamer than zero;

wherein, determining the stream media file having the characteristic of frequent returning in the stream media file in the file set as the target stream media file according to the transition probability includes:

determining the node having the characteristic of frequent returning in the Markov chain according to the transition probability;

determining other nodes having the two-way intercommunication characteristic with the node as having the characteristic of frequent returning when the node in the Markov chain is determined as having the characteristic of frequent returning; and using the media file corresponding to the node having the characteristic of frequent returning as the target stream media file; transmitting the target stream media file to a second terminal apparatus.

2. The method according to claim 1, wherein determining the target stream media file that the first terminal apparatus accesses most frequently in the stream media file in the file set according to the transition probability includes:

determining the stream media file having a characteristic of frequent returning in the stream media file in the file set as the target stream media file according to the transition probability, wherein the stream media file having the characteristic of frequent returning is a stream media file of which the probability of being accessed by the first terminal apparatus once again after being accessed by the first terminal apparatus and being subject to at least one transition satisfies a first predetermined condition.

3. The method according to claim 1, wherein each stream media file corresponds to a complete media content.

4. The method according to claim 1, wherein the file set corresponds to a complete media content; the complete media content is divided into a plurality of content segments; and the plurality of stream media files and the plurality of content segments correspond to each other one by one.

5. The method according to claim 1, wherein transmitting the target stream media file to the second terminal apparatus includes:

obtaining a network connection parameter of the second terminal apparatus, determining whether the network connection parameter of the second terminal apparatus satisfies a second predetermined condition;

transmitting the target stream media file to the second terminal apparatus when the network connection parameter of the second terminal apparatus satisfies the second predetermined condition.

6. The method according to claim 1, further comprises:

obtaining an access parameter when the first terminal apparatus accesses the file set when the first terminal apparatus accesses the stream media file in the file set, determining the target stream media file that the first terminal apparatus accesses most frequently in the stream media file in the file set according to the transition probability includes determining the target stream media file that the first terminal apparatus accesses most frequently in the stream time file in the file set according to the transition probability and the access parameter.

7. The method according to claim 6, wherein the access parameter includes the stream media file accessed in the file set by the first terminal apparatus and duration of the access of the accessed stream media file.

8. The method according to claim 1, after making statistics of the transition probability of each stream media file in the file set transiting to the respective stream media files in the file set according to the transition parameter of at least one first terminal apparatus, wherein the method further comprises updating the transition probability according to the transition parameter obtained when the first terminal apparatus accesses the file set after making statistics of the transition probability.

9. A server comprising:

a storing unit configured to store a file set including a plurality of stream media files;

a transition parameter acquiring unit configured to obtain a transition parameter at the time of the first terminal apparatus accessing the file set when the first terminal apparatus accesses the stream media file in the file set, wherein, the transition parameter being for indicating that the first terminal apparatus transits to a second stream media file from a first stream media file in the file set when the first terminal apparatus accesses, and the first stream media file being same as or different from the second stream media file;

a probability statistic unit configured to make statistics of transition probability of each stream media file in the file set transiting to the respective stream media files in the file set according to the transition parameter of at least one first terminal apparatus;

a file determining unit configured to determine the target stream media file that the first terminal apparatus accesses most frequently in the stream media file in the file set according to the transition probability; and a transmitting unit configured to transmit the target stream media file to a second terminal apparatus, wherein the server further comprises:

a Markov chain generating unit configured to generate a Markov chain related to the stream media file in the file set, wherein the Markov chain generating unit generates file nodes in the Markov chain corresponding to the stream media files in the file set one by one, and a start node of the Markov chain positioned at front of all the file nodes and an end node of the Markov chain positioned at the end of all the file nodes;

a transition matrix generating unit configured to generate a Markov state transition matrix related to the Markov chain according to the transition probability;

a two-way intercommunication characteristic node determining unit configured to determine nodes having a two way intercommunication characteristic in the Markov chain according to the Markov state transition matrix, wherein, the transition probability from a first node of any two nodes having the two-way intercommunication characteristic to a second node of any two nodes having the two-way intercommunication characteristic being lamer than zero, and the transition probability from the second node of any two nodes having the two-way intercommunication characteristic to the first node of any two nodes having the two-way intercommunication characteristic being lamer than zero;

the file determining unit includes:
a node determining module configured to determine a node having a characteristic of frequent returning in the Markov chain according to the transition probability, and determine other nodes having the two-way intercommunication characteristic with the node as having the characteristic of frequent returning when the node in the Markov chain is determined as having the characteristic of frequent returning;
a file determining module configured to use the media file corresponding to the node having the characteristic of frequent returning as the target stream media file.

10. The server according to claim 9, wherein the file determining unit determines the stream media file having a characteristic of frequent returning in the stream media file in the file set as the target stream media file according to the transition probability, and wherein the stream media file having the characteristic of frequent returning is a stream media file of which the probability of being accessed by the first terminal apparatus once again after being accessed by the first terminal apparatus and being subject to at least one transition satisfies a first predetermined conditions.

11. The server according to claim 9, wherein each stream media file corresponds to a complete media content.

12. The server according to claim 9, wherein the file set corresponds to a complete media content; the complete media content is divided into a plurality of content segments; and the plurality of stream media files and the plurality of content segments correspond to each other one by one.

13. The server according to claim 9, further comprises:
a connection parameter acquiring unit configured to obtain network connection parameter of the second terminal apparatus; and
a connection determining unit configured to determine whether the network connection parameter of the second terminal apparatus satisfies a second predetermined condition,
wherein the transmitting unit transmits the target stream media file to the second terminal apparatus when the network connection parameter of the second terminal apparatus satisfies the second predetermined condition.

14. The server according to claim 9, further comprises an access parameter acquiring unit configured to obtain access parameter at the time of the first terminal apparatus accessing the file set when the first terminal apparatus accesses the stream media file in the file set, wherein the file determining unit determines the target stream time file that the first terminal apparatus accesses most frequently in the stream time file in the file set according to the transition probability and the access parameter.

15. The server according to claim 14, wherein, the access parameter includes the stream media file accessed in the file set by the first terminal apparatus and duration of the access of the accessed stream media file.

16. The server according to claim 9, further comprises the probability statistic unit further configured to, after making statistics of the transition probability of each stream media file in the file set transiting to the respective stream media files in the file set according to the transition parameter of the at least one first terminal apparatus, update the transition probability according to the transition parameter obtained when the first terminal apparatus accesses the file set after the statistics of the transition probability.

* * * * *